US012670612B2

(12) United States Patent
Zhang

(10) Patent No.: US 12,670,612 B2
(45) Date of Patent: Jun. 30, 2026

(54) GAZE TRACKING METHOD, APPARATUS, DEVICE, AND MEDIUM

(71) Applicant: Beijing Zitiao Network Technology Co., Ltd., Beijing (CN)

(72) Inventor: Benyi Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 242 days.

(21) Appl. No.: 18/533,163

(22) Filed: Dec. 7, 2023

(65) Prior Publication Data

US 2024/0193807 A1 Jun. 13, 2024

(30) Foreign Application Priority Data

Dec. 12, 2022 (CN) .......................... 202211599301.1

(51) Int. Cl.
| | |
|---|---|
| *G06T 7/73* | (2017.01) |
| *G06F 3/01* | (2006.01) |
| *G06V 40/18* | (2022.01) |

(52) U.S. Cl.
CPC ................ *G06T 7/73* (2017.01); *G06F 3/013* (2013.01); *G06V 40/193* (2022.01); *G06T 2207/30201* (2013.01)

(58) Field of Classification Search
CPC ............ G06T 7/73; G06T 2207/30201; G06V 40/193; G06F 3/013
See application file for complete search history.

(56) References Cited

U.S. PATENT DOCUMENTS

| | | | |
|---|---|---|---|
| 2021/0042520 A1* | 2/2021 | Molin | G06V 40/18 |
| 2023/0185371 A1* | 6/2023 | Shiozaki | G06T 7/62 |
| | | | 348/78 |

FOREIGN PATENT DOCUMENTS

CN 109542240 A 3/2019

OTHER PUBLICATIONS

NPL: Results Publication Date Range: Jun. 8, 1999 to Jun. 27, 2025.*
NPL: InnovationQ+ by IP.com and IEEE, Results Publication Date Range: Mar. 27, 2007 to Dec. 5, 2025.*

* cited by examiner

*Primary Examiner* — Quang N Vo
(74) *Attorney, Agent, or Firm* — BakerHostetler

(57) ABSTRACT

A gaze tracking method, an apparatus, a device and a medium are provided. The method includes: extracting a plurality of feature points according to a target content displayed on the display screen, and determining first position information of the plurality of feature points on the display screen; acquiring a user's eye image captured by the camera, wherein the eye image includes a reflection image of the target content displayed on the display screen on an ocular cornea; determining a plurality of mapping points corresponding to the plurality of feature points in the eye image, and determining second position information of the plurality of the mapping points in the eye image; and determining a position and an orientation of an eyeball according to the first position information and the second position information.

10 Claims, 3 Drawing Sheets

Extracting a plurality of feature points according to a target content displayed on the display screen, and determining first position information of the plurality of feature points on the display screen — 101

Acquiring a user' s eye image captured by the camera, the eye image comprising a reflection image of the target content displayed on the display screen on an ocular cornea — 102

Determining a plurality of mapping points corresponding to the plurality of feature points in the eye image, and determining second position information of the plurality of the mapping points in the eye image — 103

Determining a position and an orientation of an eyeball according to the first position information and the second position information — 104

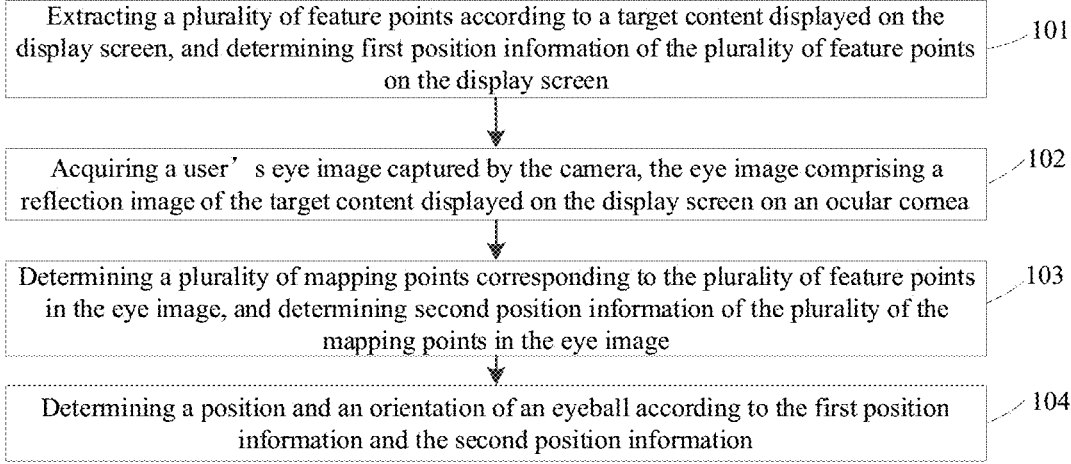

Extracting a plurality of feature points according to a target content displayed on the display screen, and determining first position information of the plurality of feature points on the display screen ⟋101

Acquiring a user's eye image captured by the camera, the eye image comprising a reflection image of the target content displayed on the display screen on an ocular cornea ⟋102

Determining a plurality of mapping points corresponding to the plurality of feature points in the eye image, and determining second position information of the plurality of the mapping points in the eye image ⟋103

Determining a position and an orientation of an eyeball according to the first position information and the second position information ⟋104

FIG. 1

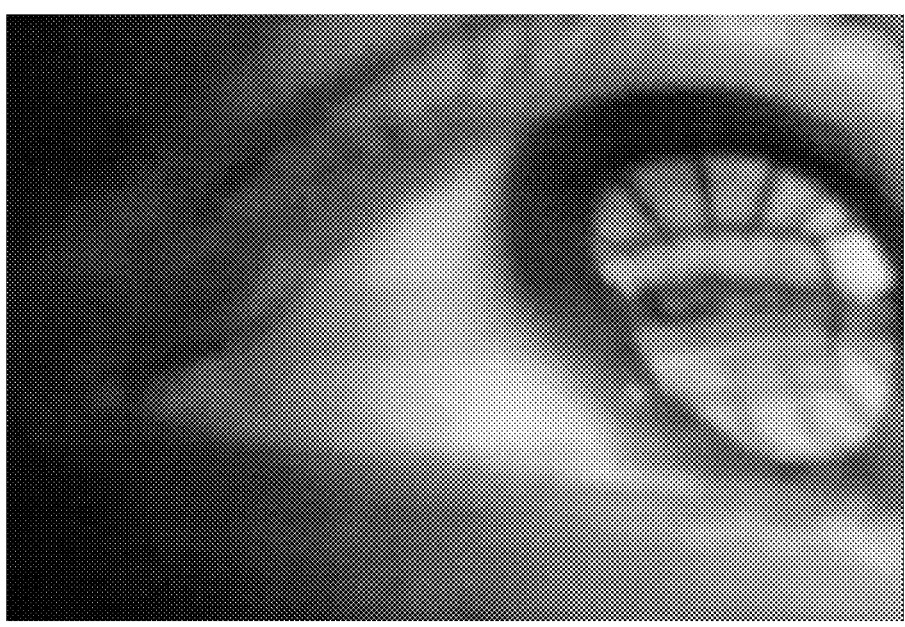

FIG. 2

GAZE TRACKING METHOD, APPARATUS, DEVICE, AND MEDIUM

CROSS-REFERENCE OF RELATED APPLICATION

The present application claims priority to Chinese Patent Application No. 202211599301.1, filed on Dec. 12, 2022, which is incorporated herein by reference in its entirety.

TECHNICAL FIELD

The present disclosure relates to the technical field of image processing, in particular to a gaze tracking method, an apparatus, a device, and a medium.

BACKGROUND

A gaze tracking technology, also known as an eye tracking technology, relates to fields such as virtual reality, human-machine interaction, and assisted driving. In the field of virtual reality, the gaze tracking technology is applied to head-mounted virtual reality devices.

In related technologies, an infrared light source and an infrared camera are arranged in the head-mounted device, the infrared light source emits infrared light, an infrared image of an eyeball is captured by the infrared camera, and a position and an orientation of the eyeball are calculated. In this scheme, the head-mounted device needs to be provided with the infrared light source, and in order to avoid the infrared light source from shielding a display screen and affecting display, the infrared light source is arranged in a position avoiding a display region, and there is a situation that the inability to present an infrared light spot on a cornea results in invalid data.

SUMMARY

In order to solve the above technical problem, the present disclosure provides a gaze tracking method, an apparatus, a device, and a medium.

Embodiments of the present disclosure provide a gaze tracking method applied to a head-mounted device, the head-mounted device comprises a display screen and a camera, and the method comprises: extracting a plurality of feature points according to a target content displayed on the display screen, and determining first position information of the plurality of feature points on the display screen; acquiring a user's eye image captured by the camera, wherein the eye image comprises a reflection image of the target content displayed on the display screen on an ocular cornea; determining a plurality of mapping points corresponding to the plurality of feature points in the eye image, and determining second position information of the plurality of the mapping points in the eye image; and determining a position and an orientation of an eyeball according to the first position information and the second position information.

Embodiments of the present disclosure further provides a gaze tracking apparatus applied to a head-mounted device, the head-mounted device comprises a display screen and a camera, and the apparatus comprises: an extracting module, configured to extract a plurality of feature points according to a target content displayed on the display screen, and determine first position information of the plurality of the feature points on the display screen; an acquiring module, configured to acquire a user's eye image captured by the camera, wherein the eye image comprises a reflection image of the target content displayed on the display screen on an ocular cornea; a determining module, configured to determine a plurality of mapping points corresponding to the plurality of feature points in the eye image, and determine second position information of the plurality of the mapping points in the eye image; and a tracking module, configured to determine a position and an orientation of an eyeball according to the first position information and the second position information.

Embodiments of the present disclosure further provide an electronic device, comprising: a processor; and a memory for storing an instruction executable by the processor. The processor is configured to read the executable instruction from the memory and execute the instruction to achieve the gaze tracking method provided by embodiments of the present disclosure.

Embodiments of the present disclosure further provide a computer-readable storage medium, and the storage medium stores a computer program. When executed by a processor, the computer program realizes the gaze tracking method provided by embodiments of the present disclosure.

Embodiments of the present disclosure further provide a computer program product, the computer program product comprises a computer program/instruction, and the computer program/instruction achieves the gaze tracking method provided by embodiments of the present disclosure when executed by a processor.

Compared to existing technology, the technical schemes provided by the embodiments of the present disclosure has following advantages. In the gaze tracking method provided by the embodiments of the present disclosure, the feature points is extracted from the target content displayed on the display screen to obtain the eye image captured by the camera, and the plurality of the mapping points corresponding to the plurality of the feature points are determined in the eye image; furthermore, according to the first position information of the plurality of the feature points in the display screen and the second position information of the plurality of the mapping points in the eye image, the position and the orientation of the eyeball are determined, thus the feature content displayed on the display screen and the feature content imaging are used as input parameters for the gaze tracking algorithm, to achieve the gaze tracking without arranging the infrared light source, and thus the cost of the head-mounted device is reduced. In addition, the technical problem of invalid data caused by inability to present an infrared light spot on a cornea due to arranging the infrared light source in the position avoiding the display region is solved, and the accuracy and reliability of the gaze tracking result are improved.

BRIEF DESCRIPTION OF THE DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale.

FIG. 1 is a flow schematic diagram of a gaze tracking method provided in an embodiment of the present disclosure;

FIG. 2 is a schematic diagram of an eye image provided in an embodiment of the present disclosure;

DETAILED DESCRIPTION

Figure 3:
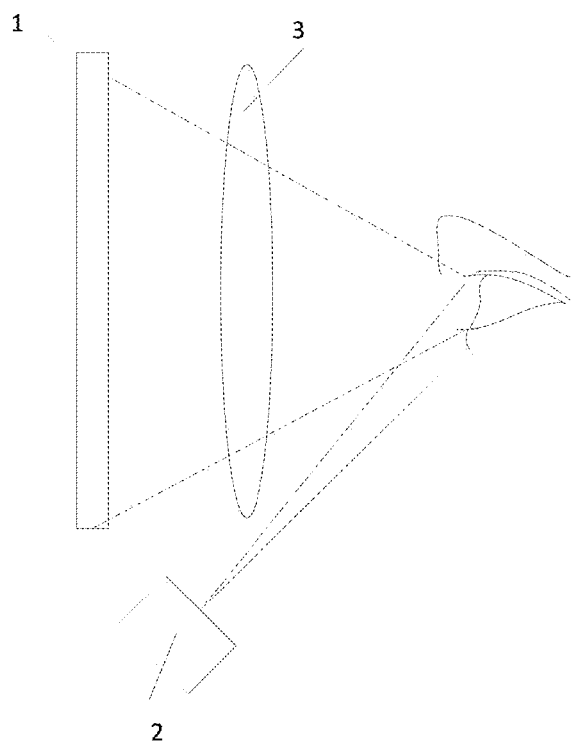
FIG. 3 is a schematic diagram of a head-mounted device provided in an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

An embodiment of the present disclosure provides a gaze tracking method, and the method is introduced below in combination with the specific embodiments.

FIG. 1 is a flow schematic diagram of a gaze tracking method provided in an embodiment of the present disclosure. The method may be executed by a gaze tracking apparatus, herein the apparatus may be achieved by using software and/or hardware and may generally be integrated into an electronic device. As shown in FIG. 1, the method includes steps 101-104.

Step 101: extracting a plurality of feature points according to a target content displayed on a display screen, and determining first position information of the plurality of the feature points on the display screen.

The gaze tracking method in the embodiment of the present disclosure is applied to a head-mounted device, herein the head-mounted device includes a display screen and a camera, the display screen is configured to present the display content to a user, the camera is configured to collect an eye image of the user, and the head-mounted device includes but is not limited to a virtual reality (VR) device, a mixed reality (MR) device, and an augmented reality (AR) device. As an example, the VR device is VR eyeglasses.

In the embodiment of the present disclosure, the target content is displayed on the display screen of the head-mounted device, the target content is analyzed to extract a plurality of mark points from the target content, the mark points are used as the feature points, and the first position information of each feature point on the display screen is determined. Optionally, the mark points extracted may be easily recognizable, and the first position information of the feature point on the display screen, for example, is coordinates of the feature point on the display screen.

Herein, the target content displayed on the display screen is a known content, and the target content may be a content stored in the head-mounted device or a content acquired from an external device by communication between the head-mounted device and the external device.

As an example, the target content is an image stored in the head-mounted device, the image is displayed on the display screen of the head-mounted device, the plurality of the feature points are extracted based on the image, and the coordinates of each feature point on the display screen are determined.

Step 102: acquiring a user's eye image captured by the camera, herein the eye image includes a reflection image of the target content displayed on the display screen on an ocular cornea.

In this embodiment, in the case where the target content is displayed on the display screen of the head-mounted device, the target content may be mapped to a pupil. The eye image is captured by the camera, to obtain the reflection image of the target content on the ocular cornea, herein the eye image includes a region where the target content displayed on the display screen is imaged in a human eye. As an example, the eye image is shown in FIG. 2.

A hardware portion of the head-mounted device is exemplarily illustrated below.

For example, referring to FIG. 3, the head-mounted device includes a display screen 1, a camera 2, and a display lens 3, herein the display lens 3 is used for anti-distortion remapping. The camera 2 in FIG. 3 is arranged below the display screen 1; in this position, the eye image can be captured and the display region is avoided, without shielding the display screen and affecting display. It should be noted that the structure in this example is only one example, and the camera may be arranged in a direction such as a upper, lower, and lateral direction of the display screen, which is not specifically limited here.

Step 103: determining a plurality of mapping points corresponding to the plurality of the feature points in the eye image, and determining second position information of the plurality of the mapping points in the eye image.

In this embodiment, since the eye image includes an imaging content of the target content, the corresponding mapping point may be determined for each feature point in the eye image. For example, 5 feature points may be extracted based on the target content, and 5 corresponding mapping points may be determined in the eye image. Furthermore, the second position information of each mapping point in the eye image is determined, herein the second position information of the mapping point in the eye image is, for example, a coordinate of the mapping point in the eye image.

As a possible implementation mode, feature analysis is performed based on the target content displayed on the display screen and the eye image, as to determine the mapping points of the feature points mapped to the eye image.

Step 104: determining a position and an orientation of an eyeball according to the first position information and the second position information.

In this embodiment, as the user's gaze changes, there are differences in the eye image captured by the camera, herein, for a certain feature point, the mapping point corresponding to the feature point has a difference in the second position information in the eye image. Optionally, a gaze tracking algorithm is used, the first position information of the feature point on the display screen and the second position information of the corresponding mapping point in the eye image are used as inputs of the algorithm, to determine a gaze tracking result. Herein, the gaze tracking result includes information such as the position and the orientation of the eyeball.

As an example, a corneal reflection method is taken as an example, the position and direction of the eyeball are determined according to the first position information and the second position information, including: determining third position information according to a relative position between the camera and the display screen and the first position information, and processing the second position information and the third position information based on the corneal reflection method, to determine the position and the orientation of the eyeball. In this example, for the head-mounted device, the relative position between the camera and the display screen and the first position information of the feature point on the display screen are known, and the third position information of the feature point relative to the camera can be determined; then, the second position information and the third position information may be used as inputs for the corneal reflection method, and utilizing the corneal reflection characteristics of the human eyeball, the position and the orientation of the eyeball may be calculated by a plurality of groups of equations, to achieve gaze tracking.

The gaze tracking method for the head-mounted device in related technologies involves arranging an infrared light source such as an infrared light emitting diode (LED) and an infrared camera in the head-mounted device, herein the infrared light source emits infrared light, an infrared image of the eyeball is captured by the infrared camera, and the position and the orientation of the eyeball are calculated. In this scheme, the infrared light source needs to be arranged, thus the cost is increased. In addition, in order to avoid the infrared light source from shielding the display screen and affecting display, the infrared light source is arranged in a position avoiding a display region. Since the position is deviated to the edge, there is a situation that an infrared spot may not be presented on the cornea, resulting in invalid data.

According to the technical schemes of the embodiments of the present disclosure, the plurality of the feature points are extracted from the target content displayed on the display screen to obtain the eye image captured by the camera, and the plurality of the mapping points corresponding to the plurality of the feature points are determined in the eye image; furthermore, according to the first position information of the plurality of the feature points in the display screen and the second position information of the plurality of the mapping points in the eye image, the position and the orientation of the eyeball are determined. Thus, the feature content displayed on the display screen and the feature content imaging are used as input parameters for the gaze tracking algorithm, to achieve the gaze tracking without arranging the infrared light source, and the arrangement cost of the infrared light source is saved, thereby the cost of the head-mounted device is reduced. In addition, the technical problem of invalid data caused by inability to present an infrared light spot on a cornea due to arranging the infrared light source in the position avoiding the display region is solved, and the accuracy and reliability of the gaze tracking result are improved.

Based on the above embodiments, implementation modes for determining the plurality of the mapping points corresponding to the plurality of the feature points are described below.

Figure 4:
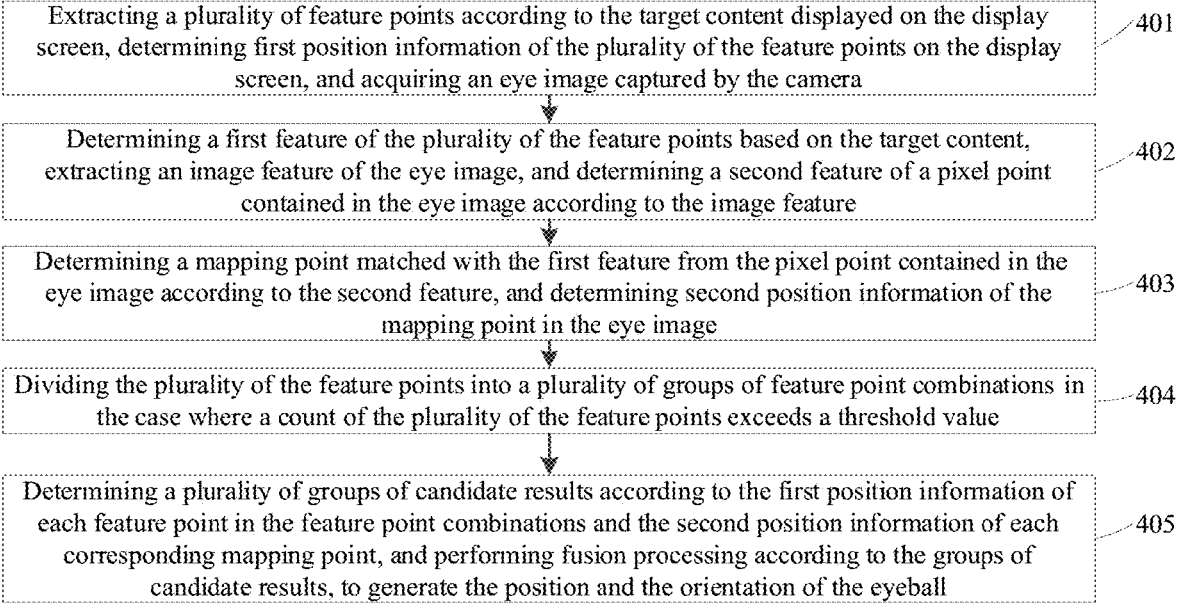
FIG. 4 is a flow schematic diagram of another gaze tracking method provided in an embodiment of the present disclosure.

FIG. 4 is a flow schematic diagram of another gaze tracking method provided in an embodiment of the present disclosure. As shown in FIG. 4, the method includes steps 401-405.

Step 401: extracting a plurality of feature points according to the target content displayed on the display screen, determining first position information of the plurality of the feature points on the display screen, and acquiring an eye image captured by the camera.

The explanation and description of Steps 101 and 102 in the aforementioned embodiment is also applicable to Step 401, which is not repeatedly described here.

Step 402: determining a first feature of the plurality of the feature points based on the target content, extracting an image feature of the eye image, and determining a second feature of a pixel point contained in the eye image according to the image feature.

In this embodiment, the camera includes a color camera and a black and white camera. Optionally, the camera adopts a macro color camera or a macro black and white camera. By adjusting the camera focal distance to adapt to the head-mounted device, the image clarity is improved, and it is guaranteed that the image feature of the eye image is identified. The camera focal distance may be set according to an actual distance between the camera and the human eye.

Herein, the image feature includes but is not limited to a color feature, a texture feature, a shape feature, and a corner feature.

As an example, in the case where the camera is a color camera, extracting the image feature of the eye image includes: extracting the color feature, the shape feature, and the corner feature of the eye image. In this example, by extracting the color feature of the eye image, the color value of each pixel point in the eye image may be determined. Herein the shape feature includes a contour feature and a region feature, and by extracting the shape feature and the corner feature of the eye image, a parameter related to the shape feature and the corner feature of each pixel point in the eye image may be determined. This parameter, for example, includes a position relationship of the pixel point in the contour/region, and thus, the second feature of the pixel point is determined according to the color value and the related parameter. Optionally, the above example is referred, the color feature, the shape feature, and the corner feature are extracted according to the target content displayed on the display screen, and then the first feature of the plurality of the feature points can be determined.

As another example, if the camera is a black and white camera, extracting the image feature of the eye image includes: extracting the grayscale feature, the shape feature, and the corner feature of the eye image. In this example, by extracting the grayscale feature of the eye image, the grayscale value of each pixel point in the eye image may be determined, and by extracting the shape feature and the corner feature of the eye image, the parameter related to the shape feature and the corner feature of each pixel point in the eye image may be determined, and the second feature of the pixel point may be determined according to the grayscale value and the related parameter. Optionally, the above example is referred, the grayscale feature, the shape feature, and the corner feature are extracted according to the target content displayed on the display screen, and then the first feature of the plurality of the feature points is determined.

Step 403: determining a mapping point matched with the first feature from the pixel point contained in the eye image according to the second feature, and determining second position information of the mapping point in the eye image.

In this embodiment, after the first feature of each feature point and the second feature of each pixel point are determined, the first feature of the feature point is compared with the second feature of the pixel point. If a preset feature similarity condition is satisfied, it is determined that the pixel point is the mapping point corresponding to the feature point. Optionally, for a plurality of image features such as color and shape, when both the first feature and the second feature corresponding to each type satisfy the preset condition, it is determined that the pixel point is the mapping point corresponding to the feature point.

As an example, the color feature is taken as an example, the first color value of each feature point is compared with the second color value of the pixel point. If the first color value is equal to the second color value, it is determined that the preset color similarity condition is satisfied. Herein, the first color value being equal to the second color value includes: the case that the first color value is equal to the second color value, or the case that the error between the first color value and the second color value is within a preset range. The description of the color feature in this example is also applicable to the aforementioned image features such as the shape feature and the corner feature.

In the embodiment of the present disclosure, the corresponding relationship between the feature point and the mapping point may affect the accuracy of the subsequent gaze tracking result. Therefore, in order to improve the accuracy of feature analysis, in one embodiment of the present disclosure, the display screen is divided into a plurality of regions, herein the plurality of the regions may be divided as needed. For example, the plurality of the regions may include an upper left region, an upper right region, a lower left region, and a lower right region. For another example, the plurality of the regions may include an intermediate region and an edge region.

In this embodiment, the imaging region of the target content in the eye image may be determined, and the imaging region is divided into a plurality of sub-regions. For example, the imaging region may be divided into an upper left sub-region, an upper right sub-region, a lower left sub-region, and a lower right sub-region. Furthermore, the target region of the feature point in the plurality of the regions of the display screen may be determined, and the target content displayed on the display screen corresponds to the corresponding imaging content in the eye image. Therefore, the corresponding sub-region may be determined in the imaging region according to orientation information of the target region in the display screen. Furthermore, the mapping point corresponding to the feature point is determined in the corresponding sub-region, a situation of being mismatched with pixel points in other sub-regions is reduced, the accuracy of correspondence between the feature point and the mapping point is improved, and the accuracy of the gaze tracking result is further improved.

As an example, for a feature point A, the target region to which the feature point A belongs is determined from the plurality of the regions, and the sub-region corresponding to the target region is determined in the eye image. Match the first feature of the feature point A and the second feature of each pixel point in the sub-region, and a mapping point B corresponding to the feature point A is determined from the pixel points according to the matching result. In this example, an image semantic segmentation model or a target detection model may be pre-trained, so as to determine the imaging region and non-imaging region of the target content in the eye image.

Step 404: in the case where a count of the plurality of the feature points exceeds a threshold value, dividing the plurality of the feature points into a plurality of groups of feature point combinations.

Herein, each group of the feature point combinations includes a specified number of the feature points.

In this embodiment, the first position information of the specified number of the feature points and the second position information of the specified number of the corresponding mapping points are used as inputs of the algorithm, and the position and the orientation of the eyeball may be determined. In the case where the count of the plurality of the feature points exceeds the threshold value, the plurality of groups of the feature point combinations is divided, to determine the position and the orientation of a candidate eyeball for each group of the feature point combinations.

Herein, the threshold value may be set as needed. For example, it is set to be a plurality of times of the specified number.

Step 405: determining a plurality of groups of candidate results according to the first position information of each feature point in the plurality of groups of feature point combinations and the second position information of each corresponding mapping point, and performing fusion processing according to the plurality of groups of candidate results, to generate the position and the orientation of the eyeball.

In this embodiment, for each group of the feature point combinations, the first position information of each feature point in the feature point combinations and the second position information of each corresponding mapping point are used as inputs of the algorithm, and outputs are used as candidate results. Therefore, for the plurality of groups of the feature point combinations, a plurality of groups of candidate results may be determined, and the plurality of groups of the candidate results comprehensively determine a final gaze tracking result.

As an example, the threshold value is set to 10, 15 feature points are extracted based on the target content, 15 corresponding mapping points are determined in the eye image, the 15 feature points are divided into 3 groups of feature point combinations, each group of the feature point combinations includes 5 feature points and corresponds to 5 mapping points. According to a corneal reflection positioning method, the 3 groups of feature point combinations determine 3 candidate results, and the average value of the 3 candidate results is used as the final gaze tracking result. Herein, the candidate result includes information such as the position and the orientation of the eyeball, and the implementation mode of the plurality of groups of the candidate results comprehensively determining the final gaze tracking result includes but is not limited to weighted average.

According to the technical schemes of the embodiments of the present disclosure, by using the second feature of the pixel point contained in the eye image, the mapping point matched with the first feature of the feature point is determined from the pixel points contained in the eye image, the corresponding relationship between the feature point and the mapping point may be accurately determined, and the accuracy of gaze tracking is guaranteed. Furthermore, determining the plurality of groups of the candidate results according to the plurality of groups of the feature point combinations and performing the fusion processing according to the plurality of groups of the candidate results to generate the position and the direction of the eyeball further improve the accuracy of the gaze tracking result.

Figure 5:
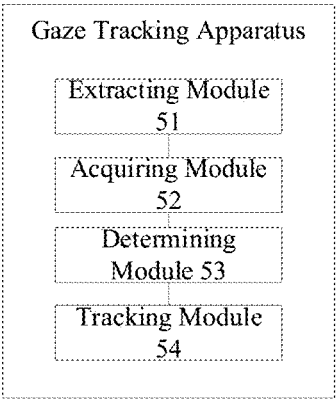
FIG. 5 is a structure schematic diagram of a gaze tracking apparatus provided in an embodiment of the present disclosure.

FIG. 5 is a structure schematic diagram of a gaze tracking apparatus provided in an embodiment of the present disclosure, and the apparatus may be achieved by software and/or hardware and may generally be integrated into an electronic device for gaze tracking. As shown in FIG. 5, the gaze tracking apparatus includes: an extracting module 51, an acquiring module 52, a determining module 53, and a tracking module 54.

Herein, the extracting module 51 is configured to extract a plurality of feature points according to a target content displayed on the display screen, and determine first position information of the plurality of the feature points in the display screen.

The acquiring module 52 is configured to acquire a user's eye image captured by the camera, and the eye image includes a reflection image of the target content displayed on the display screen on an ocular cornea.

The determining module 53 is configured to determine a plurality of mapping points corresponding to the plurality of the feature points in the eye image, and determine second position information of the plurality of the mapping points in the eye image.

The tracking module 54 is configured to, according to the first position information and the second position information, determine a position and an orientation of an eyeball.

The gaze tracking apparatus provided in the embodiment of the present disclosure may execute the gaze tracking method provided in any one embodiment of the present disclosure, and has the corresponding functional modules for executing the method and the beneficial effects.

In order to achieve the above embodiments, the present disclosure further provides a computer program product, including a computer program/instruction, and when the computer program/instruction is executed by a processor, the gaze tracking method in the above embodiments is achieved.

Figure 6:
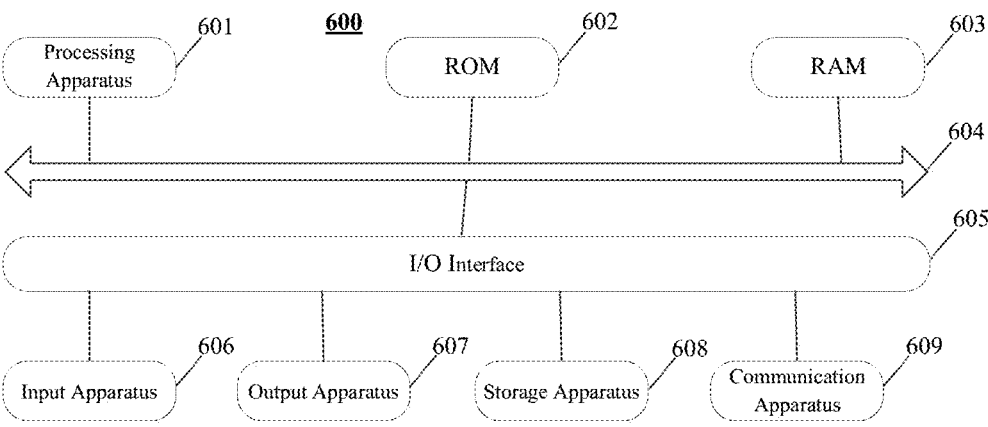
FIG. 6 is a structure schematic diagram of an electronic device provided in an embodiment of the present disclosure.

FIG. 6 is a structure schematic diagram of an electronic device provided in an embodiment of the present disclosure.

FIG. 6 is specifically referred below, and it shows the structure schematic diagram suitable for achieving the electronic device 600 in the embodiment of the present disclosure. The electronic device 600 in the embodiment of the present disclosure may include but is not limited to a mobile terminal such as a mobile phone, a notebook computer, a digital broadcasting receiver, a personal digital assistant (PDA), a PAD (tablet computer), a portable multimedia player (PMP), a vehicle terminal (such as a vehicle navigation terminal), and a fixed terminal such as a digital television (TV) and a desktop computer. The electronic device shown in FIG. 6 is only an example and should not impose any limitations on the functions and use scopes of the embodiments of the present disclosure.

As shown in FIG. 6, the electronic device 600 may include a processing apparatus (such as a central processing unit, and a graphics processor) 601, it may execute various appropriate actions and processes according to a program stored in a read-only memory (ROM) 602 or a program loaded from a storage apparatus 608 to a random access memory (RAM) 603. In RAM 603, various programs and data required for operations of the electronic device 600 are also stored. The processing apparatus 601, ROM 602, and RAM 603 are connected to each other by a bus 604. An input/output (I/O) interface 605 is also connected to the bus 604.

Typically, the following apparatuses may be connected to the I/O interface 605: an input apparatus 606 such as a touch screen, a touchpad, a keyboard, a mouse, a camera, a microphone, an accelerometer, and a gyroscope; an output apparatus 607 such as a liquid crystal display (LCD), a loudspeaker, and a vibrator; a storage apparatus 608 such as a magnetic tape, and a hard disk drive; and a communication apparatus 609. The communication apparatus 609 may allow the electronic device 600 to wireless-communicate or wire-communicate with other devices so as to exchange data. Although FIG. 6 shows the electronic device 600 with various apparatuses, it should be understood that it is not required to implement or possess all the apparatuses shown. Alternatively, it may implement or possess the more or less apparatuses.

Specifically, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 609, or installed from the storage apparatus 608, or installed from ROM 602. When the computer program is executed by the processing apparatus 601, the above functions defined in the gaze tracking method in the embodiments of the present disclosure are executed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The above computer-readable medium may be contained in the above electronic device; and it may also exist separately without being assembled into the electronic device.

The above computer-readable medium carries one or more programs, and when the above one or more programs are executed by the electronic device, the electronic device can achieve the following steps: extracting a plurality of feature points according to a target content displayed on the display screen, and determining first position information of the plurality of the feature points in the display screen; acquiring a user's eye image captured by the camera, the eye image including a reflection image of the target content displayed on the display screen on an ocular cornea; determining a plurality of mapping points corresponding to the plurality of the feature points in the eye image, and determining second position information of the plurality of the mapping points in the eye image; and determining a position and an orientation of an eyeball according to the first position information and the second position information.

The computer program code for executing the operation of the present disclosure may be written in one or more programming languages or combinations thereof, the above programming language includes but not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, the present disclosure provides a gaze tracking method including: extracting a plurality of feature points according to a target content displayed on the display screen, and determining first position information of the plurality of feature points on the display screen; acquiring a user's eye image captured by the camera, wherein the eye image comprises a reflection image of the target content displayed on the display screen on an ocular cornea; determining a plurality of mapping points corresponding to the plurality of feature points in the eye image, and determining second position information of the plurality of the mapping points in the eye image; and determining a position and an orientation of an eyeball according to the first position information and the second position information.

According to one or more embodiments of the present disclosure, in the gaze tracking method provided by the present disclosure, determining the plurality of the mapping points corresponding to the plurality of feature points in the eye image comprises: determining a first feature of each of the plurality of feature points based on the target content; extracting an image feature of the eye image, and determining a second feature of a pixel point contained in the eye image according to the image feature; and determining a mapping point matched with the first feature from the pixel point contained in the eye image according to the second feature.

According to one or more embodiments of the present disclosure, in the gaze tracking method provided by the present disclosure, the display screen is divided into a plurality of regions, and determining the mapping point matched with the first feature from the pixel point contained in the eye image according to the second feature comprises: determining a target region, to which the each feature point belongs, from the plurality of the regions, and determining a sub-region corresponding to the target region in the eye image; and matching the first feature with the second feature of each pixel point in the sub-region, and determining the mapping point corresponding to the each feature point from each pixel point according to a matching result.

According to one or more embodiments of the present disclosure, in the gaze tracking method provided by the present disclosure, the camera is a color camera or a black and white camera, and extracting the image feature of the eye image comprises: extracting a color feature, a shape feature, and a corner feature of the eye image, or extracting a grayscale feature, a shape feature, and a corner feature of the eye image.

According to one or more embodiments of the present disclosure, in the gaze tracking method provided by the present disclosure, determining the position and the orientation of the eyeball according to the first position information and the second position information comprises: determining third position information of the each feature point relative to the camera according to a position of the camera relative to the display screen and the first position information; and processing the second position information and the third position information based on a corneal reflection method, and determining the position and the orientation of the eyeball.

According to one or more embodiments of the present disclosure, in the gaze tracking method provided by the present disclosure, determining the position and the orientation of the eyeball according to the first position information and the second position information comprises: in a case where a count of the plurality of the feature points is greater than a threshold value, the plurality of the feature points is divided into a plurality of groups of feature point combinations, wherein each of the plurality of groups of feature point combinations comprises a specified number of feature points; determining a plurality of groups of candidate results according to the first position information of each feature point in the plurality of groups of feature point combinations and the second position information of each mapping point corresponding to the each feature point; and performing fusion processing according to the plurality of groups of the candidate results, to generate the position and the orientation of the eyeball.

According to one or more embodiments of the present disclosure, the present disclosure provides a gaze tracking apparatus, including: an extracting module, configured to extract a plurality of feature points according to a target content displayed on the display screen, and determine first position information of the plurality of the feature points on the display screen; an acquiring module, configured to acquire a user's eye image captured by the camera, wherein the eye image comprises a reflection image of the target content displayed on the display screen on an ocular cornea; a determining module, configured to determine a plurality of mapping points corresponding to the plurality of feature points in the eye image, and determine second position information of the plurality of the mapping points in the eye image; and a tracking module, configured to determine a position and an orientation of an eyeball according to the first position information and the second position information.

According to one or more embodiments of the present disclosure, in the gaze tracking apparatus provided by the present disclosure, the determining module includes: an extracting unit, configured to determine a first feature of the plurality of the feature points based on the target content; a determining unit, configured to extract an image feature of the eye image, and determine a second feature of a pixel point contained in the eye image according to the image feature; and a matching unit, configured to, according to the second feature, determine a mapping point matched with the first feature from the pixel points contained in the eye image.

According to one or more embodiments of the present disclosure, in the gaze tracking apparatus provided by the present disclosure, the display screen is divided into a plurality of regions, and the matching unit is specifically configured to: determine a target region to which the feature point belongs from the plurality of the regions, and determine a sub-region corresponding to the target region in the eye image; and match the first feature with the second feature of each pixel point in the sub-region, and determine a mapping point corresponding to the feature point from the pixel points according to a matching result.

According to one or more embodiments of the present disclosure, in the gaze tracking apparatus provided by the present disclosure, the camera is a color camera or a black and white camera, and the extracting unit is specifically configured to: extract a color feature, a shape feature, and a corner feature of the eye image, or extract a grayscale feature, a shape feature, and a corner feature of the eye image.

According to one or more embodiments of the present disclosure, in the gaze tracking apparatus provided by the present disclosure, the tracking module is specifically configured to: determine third position information of the feature point relative to the camera according to a position of the camera relative to the display screen and the first position information; process the second position information based on a corneal reflection method, and the third position information, and determine the position and the orientation of the eyeball.

According to one or more embodiments of the present disclosure, in the gaze tracking apparatus provided by the present disclosure, the tracking module is specifically configured to: divide the plurality of the feature points into a plurality of groups of feature point combinations in the case where a count of the plurality of the feature points is greater than a threshold value, wherein each group of the feature point combinations includes a specified number of the feature points; determine a plurality of groups of candidate results according to the first position information of each feature point in the plurality of groups of the feature point combinations and the second position information of each corresponding mapping point; and perform fusion processing according to the plurality of groups of the candidate results to generate the position and the orientation of the eyeball.

According to one or more embodiments of the present disclosure, the present disclosure provides an electric device including a processor; and a memory for storing an instruction executable by the processor. The processor is configured to read the executable instruction from the memory and execute the instruction to achieve any one gaze tracking method provided by the present disclosure.

According to one or more embodiments of the present disclosure, the present disclosure provides a computer-readable storage medium, and the storage medium stores a computer program. When the computer program is executed by a processor, any one gaze tracking method provided by the present disclosure is achieved.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only configured to distinguish different apparatuses, modules or units, and are not intended to limit orders or interdependence relationships of functions performed by these apparatuses, modules or units. Modifications of "one" and "more" mentioned in the present disclosure are schematic rather than restrictive, and those skilled in the art should understand that unless otherwise explicitly stated in the context, it should be understood as "one or more".

Names of messages or information interacted between more apparatuses in the implementation modes of the present disclosure are only for descriptive purposes and are not intended to limit the scope of these messages or information.

The invention claimed is:

1. A gaze tracking method, applied to a head-mounted device, wherein the head-mounted device comprises a display screen and a camera, and the method comprises:

extracting a plurality of feature points corresponding to a target content displayed on the display screen;

determining first position information of the plurality of feature points on the display screen;

acquiring an image of a user's eye captured by the camera, wherein the image of the user's eye comprises a reflection image of the target content displayed on the display screen on an ocular cornea of the user's eye;

determining a plurality of mapping points corresponding to the plurality of feature points in the image of the user's eye;

determining second position information of the plurality of the mapping points in the image of the user's eye; and determining a position and an orientation of the user's eye based on the first position information and the second position information.

2. The method according to claim 1, wherein determining the plurality of the mapping points corresponding to the plurality of feature points in the image of the user's eye comprises:

determining a first feature of each of the plurality of feature points based on the target content;

extracting an image feature of the image of the user's eye, and determining a second feature of a pixel point contained in the image of the user's eye according to the image feature; and determining a mapping point matched with the first feature from the pixel point contained in the image of the user's eye according to the second feature.

3. The method according to claim 2, wherein the display screen is divided into a plurality of regions, and determining the mapping point matched with the first feature from the pixel point contained in the image of the user's eye according to the second feature comprises:

determining a target region, to which the each feature point belongs, from the plurality of the regions, and determining a sub-region corresponding to the target region in the image of the user's eye; and matching the first feature with the second feature of each pixel point in the sub-region, and determining the mapping point corresponding to the each feature point from each pixel point according to a matching result.

4. The method according to claim 2, wherein the camera is a color camera or a black and white camera, and extracting the image feature of the image of the user's eye comprises:

extracting a color feature, a shape feature, and a corner feature of the image of the user's eye, or extracting a grayscale feature, a shape feature, and a corner feature of the image of the user's eye.

5. The method according to claim 1, wherein determining the position and the orientation of the user's eye based on the first position information and the second position information comprises:

determining third position information of the each feature point relative to the camera according to a position of the camera relative to the display screen and the first position information; and processing the second position information and the third position information based on a corneal reflection method, and determining the position and the orientation of the user's eye.

6. The method according to claim 1, wherein determining the position and the orientation of the user's eye based on the first position information and the second position information comprises:

in a case where a count of the plurality of the feature points is greater than a threshold value, the plurality of the feature points is divided into a plurality of groups of feature point combinations, wherein each of the plurality of groups of feature point combinations comprises a specified number of feature points;

determining a plurality of groups of candidate results according to the first position information of each feature point in the plurality of groups of feature point combinations and the second position information of each mapping point corresponding to the each feature point; and performing fusion processing according to the plurality of groups of the candidate results, to generate the position and the orientation of the user's eye.

7. An electronic device, comprising:

a processor; and a memory for storing an instruction executable by the processor;

wherein the processor is configured to read the executable instruction from the memory and execute the instruction to achieve the gaze tracking method according to claim 1.

8. A non-transitory computer-readable storage medium, wherein the storage medium stores a computer program, and when the computer program is executed by a processor, the gaze tracking method according to claim 1 is achieved.

9. A non-transitory computer program product, wherein the non-transitory computer program product comprises a computer program/instruction;

when the computer program/instruction is executed by a processor, the gaze tracking method according to claim 1 is achieved.

10. A gaze tracking apparatus, applied to a head-mounted device, wherein the head-mounted device comprises a display screen and a camera, and the apparatus comprises:

an extracting module, configured to extract a plurality of feature points corresponding to a target content displayed on the display screen, and determine first position information of the plurality of the feature points on the display screen;

an acquiring module, configured to acquire an image of a user's eye captured by the camera, wherein the image of the user's eye comprises a reflection image of the target content displayed on the display screen on an ocular cornea;

a determining module, configured to determine a plurality of mapping points corresponding to the plurality of feature points in the image of the user's eye, and determine second position information of the plurality of the mapping points in the image of the user's eye; and a tracking module, configured to determine a position and an orientation of the user's eye according to the first position information and the second position information.

\* \* \* \* \*